US009362712B1

(12) United States Patent
Sheik-Bahae et al.

(10) Patent No.: US 9,362,712 B1
(45) Date of Patent: Jun. 7, 2016

(54) NO-VIBRATION CRYOGENIC COOLING OF REFERENCE CAVITIES FOR HIGH-PRECISION METROLOGY USING OPTICAL REFRIGERATION

(71) Applicants: Mansoor Sheik-Bahae, Albuquerque, NM (US); Richard I. Epstein, Sante Fe, NM (US)

(72) Inventors: Mansoor Sheik-Bahae, Albuquerque, NM (US); Richard I. Epstein, Sante Fe, NM (US)

(73) Assignee: STC.UNM, Albuquerque, NM (US)

( * ) Notice: Subject to any disclaimer, the term of this patent is extended or adjusted under 35 U.S.C. 154(b) by 0 days.

(21) Appl. No.: 14/812,350

(22) Filed: Jul. 29, 2015

Related U.S. Application Data

(60) Provisional application No. 62/030,417, filed on Jul. 29, 2014.

(51) Int. Cl.
*H01S 3/13* (2006.01)
*H01S 3/106* (2006.01)
*H01S 3/16* (2006.01)
*H01S 3/042* (2006.01)
*H01S 3/137* (2006.01)
*H01S 3/131* (2006.01)
*H01S 3/04* (2006.01)

(52) U.S. Cl.
CPC ............ *H01S 3/1062* (2013.01); *H01S 3/04* (2013.01); *H01S 3/042* (2013.01); *H01S 3/0408* (2013.01); *H01S 3/13* (2013.01); *H01S 3/1304* (2013.01); *H01S 3/1305* (2013.01); *H01S 3/137* (2013.01); *H01S 3/1317* (2013.01); *H01S 3/1618* (2013.01); *H01S 3/1653* (2013.01)

(58) Field of Classification Search
CPC ...... H01S 3/137; H01S 3/1304; H01S 3/1305; H01S 3/1317; H01S 3/13; H01S 3/04; H01S 3/0408; H01S 3/042; H01S 3/1653; H01S 3/1618
USPC ..................... 372/32, 29.02, 34, 41
See application file for complete search history.

(56) References Cited

U.S. PATENT DOCUMENTS

| | | | | |
|---|---|---|---|---|
| 6,041,610 A | * | 3/2000 | Edwards | F25B 23/00 62/264 |
| 8,720,219 B1 | * | 5/2014 | Sheik-Bahae | F25B 23/00 372/34 |
| 2010/0040105 A1 | * | 2/2010 | Rocca | H05G 2/001 372/75 |
| 2014/0105232 A1 | * | 4/2014 | Vahala | G02B 6/12007 372/9 |

* cited by examiner

*Primary Examiner* — Kinam Park
(74) *Attorney, Agent, or Firm* — MH2 Technology Law Group, LLP

(57) ABSTRACT

Provided is a method and system for stabilizing a property of a first laser beam from a first laser in a vibration-free and cryogen free-manner. The method can include optically cooling a ytterbium-doped yttrium lithium fluoride (Yb:YLF) crystal using a second laser beam; coupling the crystal to a thermal coupling, wherein the thermal coupling is further coupled to a reference cavity to maintain a temperate of the reference cavity; directing a portion of the first laser beam through the reference cavity onto a photodetector to measure the property of the first laser beam; and stabilizing the first laser beam using a feedback control mechanism using the photodetector.

13 Claims, 8 Drawing Sheets

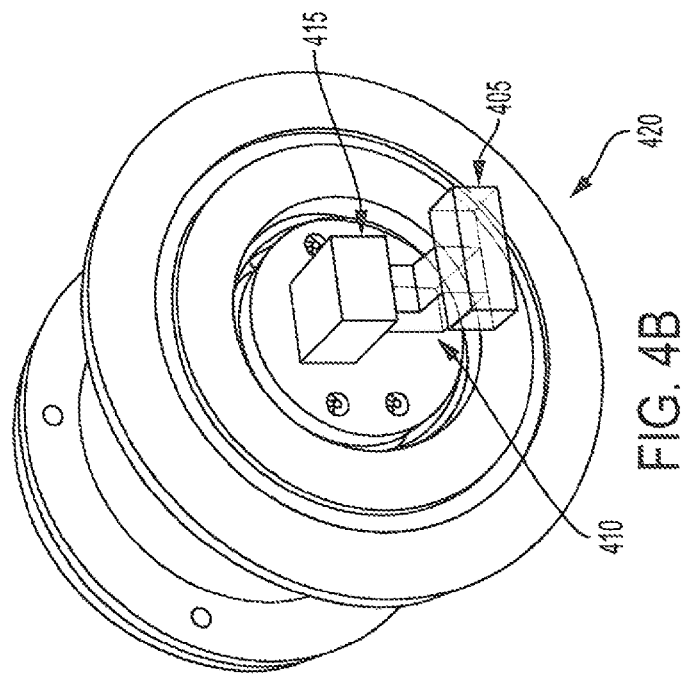
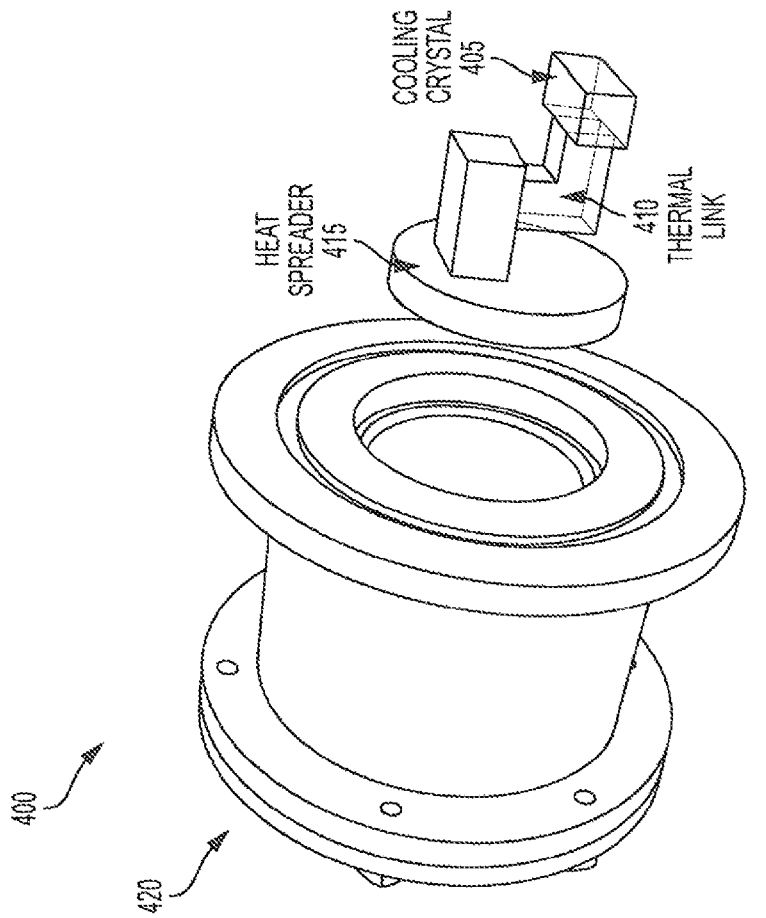
FIG. 4A
FIG. 4B

NO-VIBRATION CRYOGENIC COOLING OF REFERENCE CAVITIES FOR HIGH-PRECISION METROLOGY USING OPTICAL REFRIGERATION

CROSS-REFERENCE TO RELATED APPLICATIONS

This application claims priority to U.S. Provisional Patent Application Ser. No. 62/030,417 filed on Jul. 29, 2014, the disclosure of which is incorporated by reference herein in its entirety.

GOVERNMENT RIGHTS

The present invention was made with Government support under Contract Number 10669320 awarded by DARPA. The Government has certain rights in the invention.

FIELD

This invention relates generally to the field of optically cooling, and specifically to the field of optically cooling laser systems.

BACKGROUND

Optical refrigeration can include laser excitation of rare-earth doped glass and crystal host material systems. In some systems, optical refrigeration can include use of ytterbium doped fluorozirconate glass (Yb:ZBLAN).

In modern interpretation, the cooling cycle is based on conversion of low-entropy low-energy input optical field (laser) into an isotropic higher-energy spontaneous emission (fluorescence). Excitation laser is red-shifted from the mean spontaneous emission energy of the transition ($\lambda_f$). Following absorption, out of equilibrium excitation gets thermalized within the ground and excited state manifolds of the rare-earth ion. This is accomplished by phonon absorption from the lattice vibrations of the host. Thus thermal quanta of energy kT are carried away from the host in a form of spontaneously emitted photons, leading to cooling of the material.

Heat generating, non-radiative recombination pathways are not desirable, demanding high quantum efficiency ($\eta_{eqe}$) materials. Rare-earth ions (e.g. Ytterbium) exhibit metastable transitions in the lowest energy levels, satisfying high quantum efficiency requirement. Additional requirement is of host purity. Impurities introduce extrinsic heat generating recombination pathways, e.g. transition-metal impurity, which is manifested in reduction of absorption efficiency, $\eta_{abs}$, defined below. Both of these requirements are captured in expression for cooling efficiency, defined as a ratio of cooling power to absorbed power:

$$\eta_c(\lambda, T) = \frac{P_{cool}}{P_{abs}} = \eta_{eqe} \left[ \frac{1}{1 + \alpha_b / \alpha_r(\lambda, T)} \right] \frac{\lambda}{\lambda_f(T)} - 1 \quad (1)$$

where $\lambda$ denotes laser wavelength, $\alpha_b$ is the background absorption coefficient while $\alpha_r(\lambda)$ resonant absorption coefficient of Yb ions. The product in brackets is denoted as absorption efficiency $\eta_{abs}$. In practical considerations, material sheds a $k_B T$ of thermal energy per excitation, which means that the product $\eta_{eqe}\eta_{abs} > 1 - k_B T / h\nu_F$, where $\nu_F = c/\lambda_F$, c—speed of light. For room temperature Yb emission this product has to be larger than 96.8%, while at 100K, larger than 99%. Since $\eta_{eqe}$ is governed by intrinsic recombination mechanisms for a given material, one must improve $\eta_{abs}$ in order to obtain low temperature operation of an optical refrigerator.

The standard approach to increase absorption efficiency has been to lower background absorption by purifying material growth process and starting materials. While this is an important task, increase of resonant absorption has been largely ignored, due to the fundamental reason. As material cools resonant absorption in the anti-Stokes tail falls exponentially, according to Boltzmann law. It is mainly this reason that halts cooling at low temperatures.

Vibration-free cryogenic operation in ytterbium-doped fluoride crystals has been reported. The record is cooling to 93K from room temperature. While numerous applications benefit from this technology, one application stands out which concerns ultrastable lasers using reference external cavities made of monolithic single crystal silicon cooled to 124K. The vibration-free nature of optical refrigeration and the temperature range of operation render this application desirable.

SUMMARY

In accordance with the present teachings, a method for stabilizing a property of a first laser beam from a first laser in a vibration-free and cryogen free-manner is provided. The method can comprise optically cooling a ytterbium-doped yttrium lithium fluoride (Yb:YLF) crystal using a second laser beam; coupling the crystal to a thermal link, wherein the thermal link is further coupled to a reference cavity to maintain a temperate of the reference cavity; directing a portion of the first laser beam through the reference cavity onto a photodetector to measure the property of the first laser beam; and stabilizing the first laser beam using a feedback control mechanism using the photodetector.

In some aspects, the reference cavity comprises a single-crystal silicon Fabry-Perot.

In some aspects, the thermal link comprises a sapphire thermal link.

In some aspects, the method can comprise further comprise maintaining the reference cavity, Yb:YLF crystal, and thermal link at or near a vacuum pressure.

In some aspects, the temperature is about 124K.

In some aspects, the property is a frequency or a wavelength of the first laser.

In accordance with the present teachings, a system for stabilizing a property of a first laser beam of a first laser in a vibration-free and cryogen free-manner is provided. The system can comprise a reference cavity comprising an entrance aperture operable to receive the first laser beam and an exit aperture operable to provide the first laser beam to a feedback control system, wherein the reference cavity is optically cooled with a second laser beam characterized with an energy sufficient to maintain a coefficient of thermal expansion of the reference cavity at about zero.

In some aspects, the reference cavity comprises a single-crystal silicon Fabry-Perot laser cavity.

In some aspects, the system can further comprise a thermally conductive outer member that surround at least a portion of the reference cavity; and a thermal coupling comprising a first surface that is coupled to a portion of the thermally conductive outer member and a second surface that is coupled to a ytterbium-doped yttrium lithium fluoride (Yb:YLF) crystal, wherein the Yb:YLF crystal is optically cooled by the second laser beam to produce a thermal gradient in the thermal link.

In some aspects, the thermal link comprises a sapphire thermal link.

In some aspects, the system can further comprise an enclosure housing the reference cavity, the thermal coupling, Yb:YLF crystal that is maintain at or near a vacuum pressure.

In some aspects, the property of the first laser beam is a frequency or a wavelength of the first laser beam.

In some aspects, the system further comprises a feedback system operable to receive the first laser beam from a photodetector that receives the first laser beam from the reference cavity to control the property of the first laser beam.

BRIEF DESCRIPTION OF THE DRAWINGS

FIGS. 4A and 4B show the cold components of the optical refrigerator, according to embodiments, in a separated and connected arrangement, respectively.

DETAILED DESCRIPTION

Reference will now be made in detail to the present embodiments, examples of which are illustrated in the accompanying drawings. Wherever possible, the same reference numbers will be used throughout the drawings to refer to the same or like parts.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 5. In certain cases, the numerical values as stated for the parameter can take on negative values. In this case, the example value of range stated as "less that 10" can assume negative values, e.g. −1, −2, −3, −10, −20, −30, etc.

The following embodiments are described for illustrative purposes only with reference to the Figures. Those of skill in the art will appreciate that the following description is exemplary in nature, and that various modifications to the parameters set forth herein could be made without departing from the scope of the present invention. It is intended that the specification and examples be considered as examples only. The various embodiments are not necessarily mutually exclusive, as some embodiments can be combined with one or more other embodiments to form new embodiments.

Figure 1:
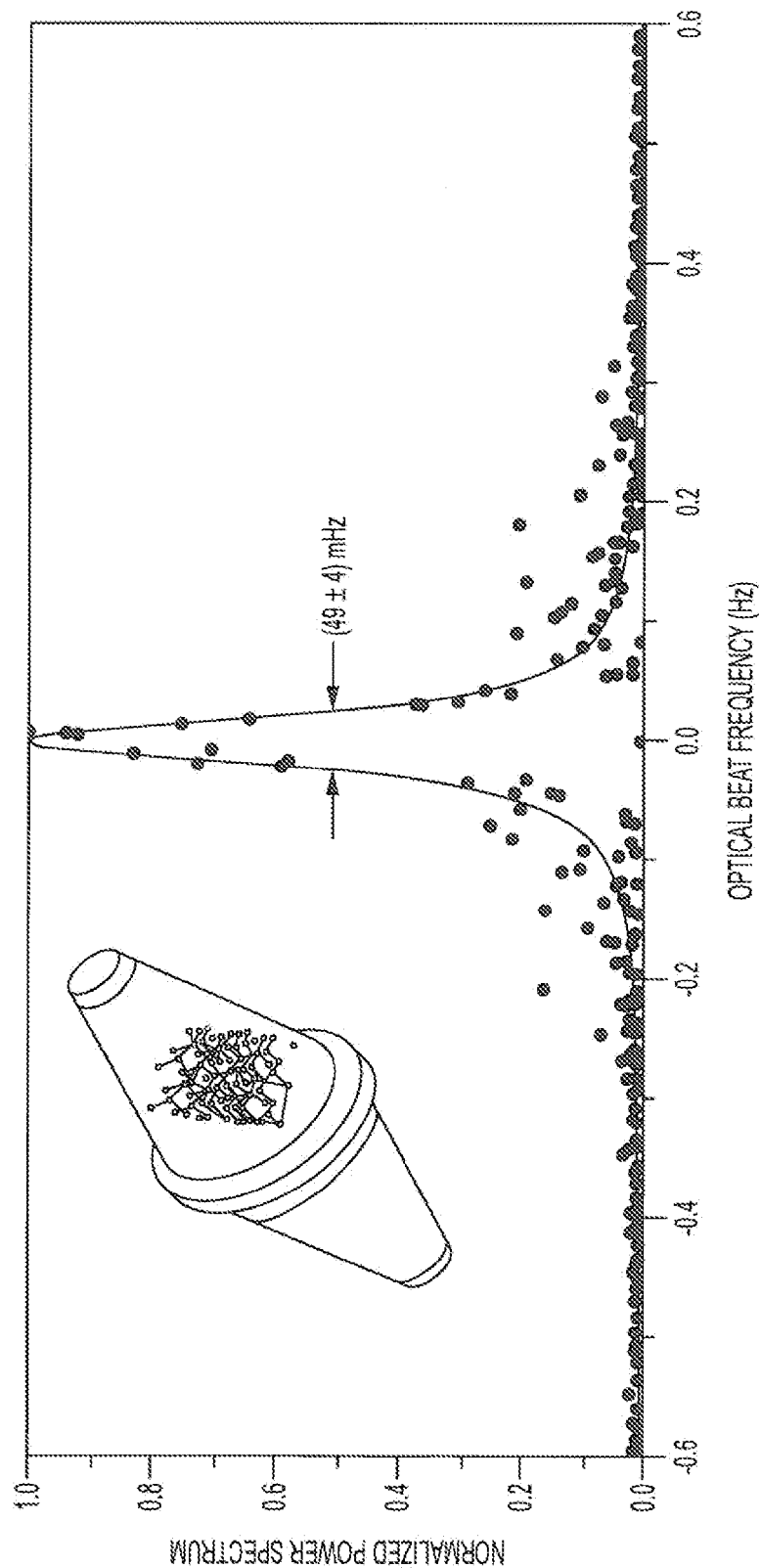
FIG. 1 shows an optical heterodyne beat between a prior art silicon cavity system and a reference laser. The data are the Fourier transform of the beat signal and the red line is a Lorentzian fit that highlights the laser's extreme stability. The insert is a drawing of the single-crystal cavity.

Ultrastable lasers and interferometers are important for the most accurate measuring science. This science includes gravitational wave detection, cavity quantum electrodynamics, quantum optomechanics and precision tests of relativity. On a more commercial level, the ability to measure and precisely control laser frequencies promises tremendous advances in the performance of atomic clocks and frequency standards which will define the next generation of navigation and communication standards. The sensitivity and stability of the lasers is ultimately set by Brownian noise in the spaces and mirrors of the laser cavity. As reported by Kessler, T, Hagermann, C., Grebing, C., Legero, T., Sterr, T., Riehle, F., Martin, M. J., Chen, L., & Ye, J., "A sub-40-mHz-linewidth laser based on a silicon single-crystal optical cavity", Nature Photonics 6, 687-692 (2012), hereinafter "Kessler", this noise has been reduced by creating a laser interferometric cavity from single-crystal silicon. This cavity interferometer was made insensitive to temperature fluctuations by cooling it to near 124 K, where the coefficient of thermal expansion of silicon has a zero crossing. With this optical cavity, they were able to demonstrate the most stable oscillator of any kind for averaging times of 0.1-10 s. FIG. 1 shows an optical heterodyne beat between the silicon cavity system and a reference laser as reported in Kessler. The data are the Fourier transform of the beat signal and the line is a Lorentzian fit that highlights the laser's extreme stability. The insert of FIG. 1 is a drawing of the single-crystal cavity.

Figure 2:
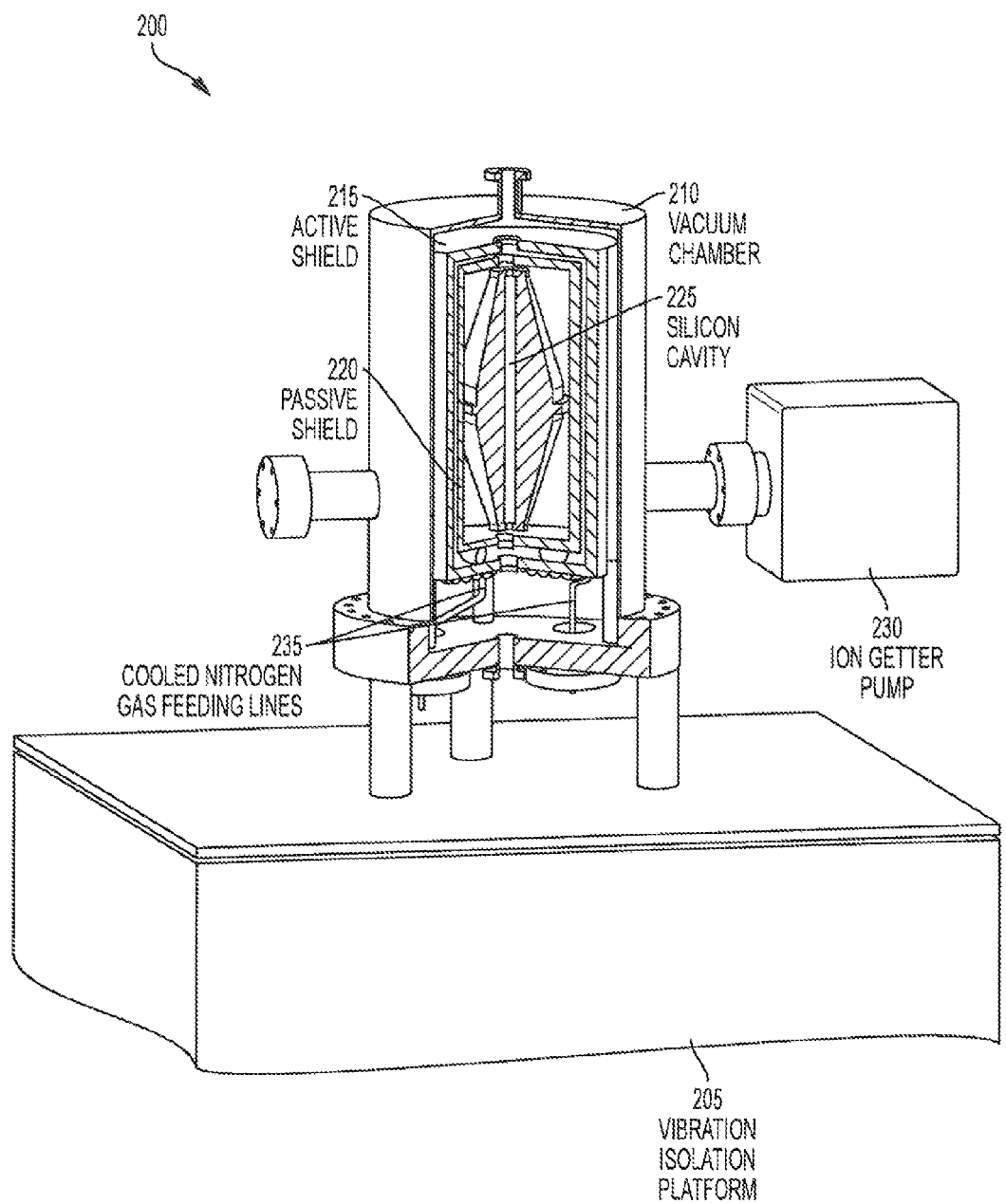
FIG. 2 is a schematic of a prior art cryostat used in to cool the silicon single-crystal laser cavity.

FIG. 2 shows a conventional cooling system 200 using refrigerants for the ultrastable laser system is the cooling system that keeps the silicon single-crystal laser cavity at the zero-crossing temperature without introducing vibrations or lowering the mechanical quality factor Q, as reported in Kessler. As shown in FIG. 2, the cooling system 200 is mounted to a vibration isolation platform 205. The cooling system 200 comprises a silicon cavity 225 surrounded with a vacuum chamber 210 comprising two gold-coated copper shields, an inner passive shield 220 and an outer active shield 215. The active shield 215 is kept at the required temperature by a controlled flow of cool nitrogen gas by cooled nitrogen gas feeding lines 235. The passive inner shield 220 suppresses radiative heat transfer from the outer active shield 215 to the silicon cavity 225. Because the nitrogen-gas cooling system 200 reliance on expendable cryogens, the uses of the silicon single-crystal laser is limited. The ion getter pump maintains a high vacuum in the dewar.

According to the present teachings, a cooling system is provided that does not rely on expendable cryogens. This would allow for additional applications for the silicon single-crystal laser, such as the case if the laser is to be used for long duration satellite mission (such as the gravitational wave experiment LISA). The disclosed cooling system provides for low temperature, 124 K and lower in a vibration-free manner.

Figure 3:
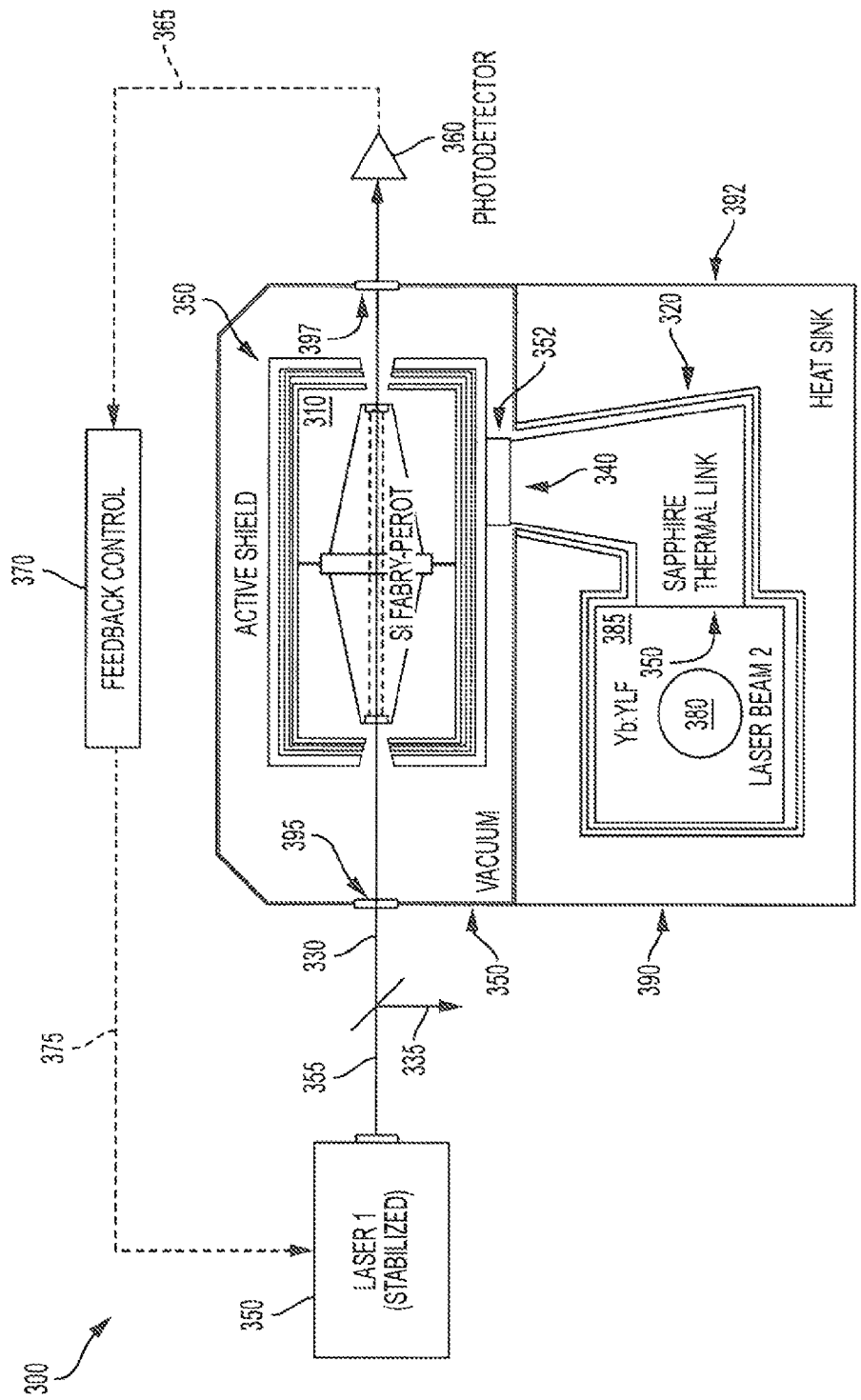
FIG. 3 shows an example laser cooling system, according to the present teachings.

FIG. 3 shows an example laser cooling system 300, according to the present teachings. The frequency of laser beam 355 produced by laser 350 is stabilized by synchronizing (locking) laser 350 to reference cavity 310, i.e., a Si Fabry-Perot as known as Si-FP, using a feedback control system 370. To achieve the stabilization of laser 350, reference cavity 310 is cooled to a temperature of about 124K±0.1K, 0.2K, 0.3K, etc. A portion of the laser beam 333 can be split using beam splitter 330 to be used for one or more applications discussed herein. The cooling is achieved using a laser (not shown) that produces laser beam 380 that is directed onto a Yb:YLF crystal 385 that optically cools the Yb:YLF crystal 385 and produces a temperature gradient that is directed to a thermally conductive outer surface or shield 350, i.e., an outer shield made of cooper or other thermally conductive material(s), of reference cavity 310 by thermal link or thermal coupling 320, i.e., a sapphire thermal link, in a vibration-free and cryogenic coolant-free manner. Thermal coupling 320 comprises a first face or surface 350 that is adjacent to and/or coupled with a face of Yb:YLF crystal 385 and a second face or surface 340 that is adjacent to and/or coupled with a portion of an outer housing of reference cavity 310. Laser beam 380 is characterized as having energy sufficient to maintain a coefficient of thermal expansion of the reference cavity 310 at about zero. Reference cavity 310 can be surrounding by one or more thermally conductive layers 350 that are able to effectively cool reference cavity 310 by direct contact or coupling with surface 340 that functions as a cold finger of thermal link 320. The laser cooling system 300 comprises an outer housing 390 that maintains the internal components including reference cavity 310, Yb:YLF crystal 385, and thermal link 320 at a vacuum or near vacuum pressure. Heat sink 392 can surround Yb:YLF crystal 385 and thermal link 320. The reference cavity 310 can be the silicon single-crystal as described relation to FIG. 2.

In operation, laser beam 380 from laser (not shown) is directed onto Yb:YLF crystal 385 that produces a thermal gradient that is thermally conductive to a thermally conductive outer shield or surface 350 of reference cavity 310 by coupling 352 to surface 340 of thermal link 320. Because the thermal conductively of the outer surface or shield 350, reference cavity 310 is able to be maintained at a desired temperature at or about 124K. Laser beam 355 is directed through aperture 395 of laser cooling system 300 and through reference cavity 310 that is cooled using laser beam 380, Yb:YLF crystal 385 thermal link 320, as discussed above, and through aperture 397 of laser cooling system 300. Laser cooling system 300 uses feedback control system 370 to control, i.e., stabilize a property (wavelength or frequency) of laser beam 355, by directing a portion of laser beam 355 through reference cavity 310 and onto detector 360 that converts the laser beam 355 to a signal that can be controlled by feedback system 370. An input signal 365 from detector 360 is received and processed by feedback control system 370, which produces output signal 375 that is used by laser 350 using, for example a controller (not shown) to stabilize a property of laser 350. For example, the detector 360 can measure a frequency of laser beam 355 and a signal representative of the measured frequency is provided to laser 350 by feedback control system 370 to change the frequency of laser beam 355 by, for example, actuating one or more optical components (not shown), i.e., mirrors, of laser 355.

Figure 5:
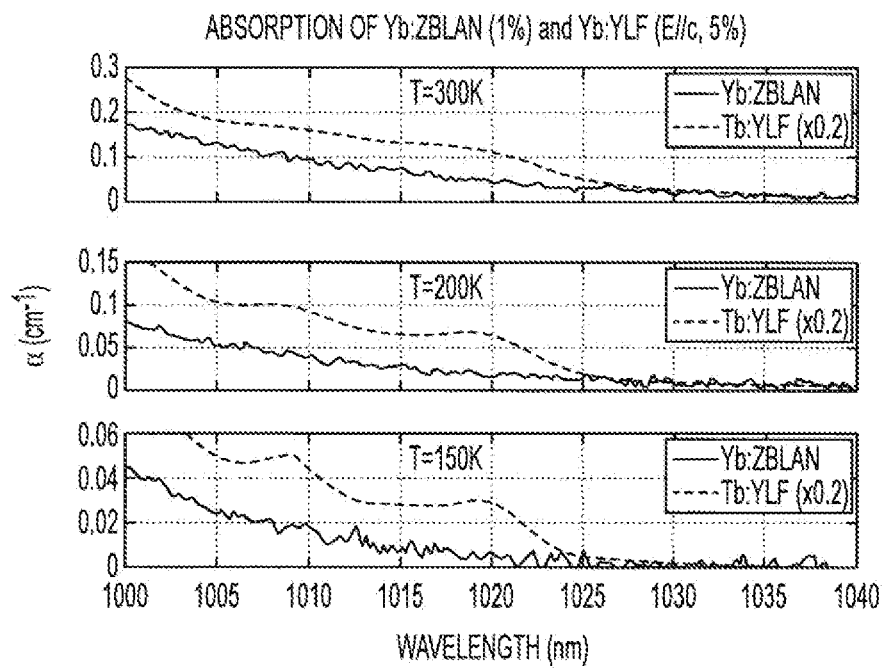
FIG. 5 shows the absorption of ytterbium (Yb), normalized for different dopant density, is shown in each of the glass host and the crystal host.
Figure 6:
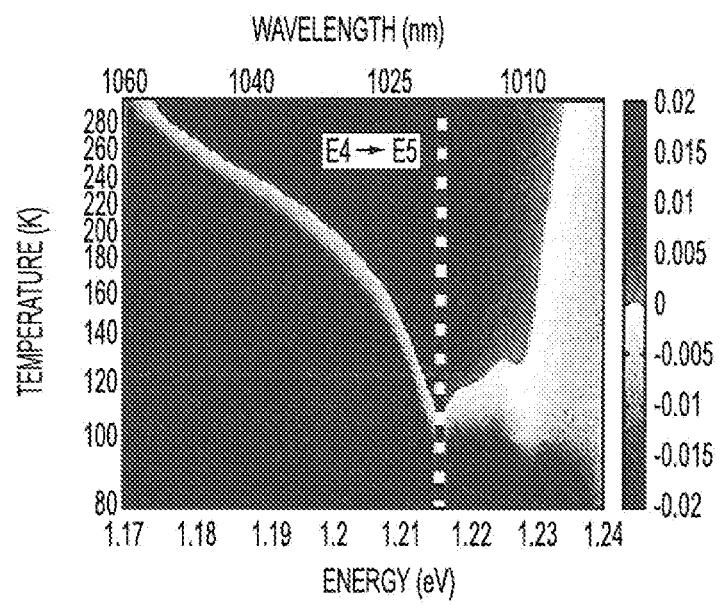
FIG. 6 shows a contour plot of cooling efficiency versus wavelength and temperature for known values of background absorption $4.2 \times 10^{-4}$ cm$^{-1}$ and external quantum efficiency of 0.995.

FIGS. 4A and 4B show the cold components of the optical refrigerator, according to embodiments, in a separated and connected arrangement, respectively. The cold components comprise a cooling crystal 405 and a heat spreader 415 connected by a thermal link 410. For example, the cooling crystal 405 can be the cooling crystal described in U.S. patent application Ser. No. 12/977,465, filed on Dec. 23, 2010, titled "Solid State Optical Refrigeration Using Stark Manifold Resonances in Crystals" to Denis V. Seletskiy et al. ("Seletskiy"), which is commonly assigned to the assignee of the present application and which is hereby incorporated by reference in its entirety. In Seletskiy, absorption tails of Yb:ZBLAN and Yb:YLF (ytterbium doped yttrium lithium fluoride crystal) are provided for comparison at different temperatures, with the Yb:YLF crystal corresponding to a doped crystal structure are shown in FIG. 5 (which is FIG. 1 in Seletskiy). In FIG. 5, the absorption of ytterbium (Yb), normalized for different dopant density, is shown in each of the glass host and the crystal host. However, when temperature is reduced, inhomogeneously broadened Yb absorption in the glass host diminishes monotonically everywhere spectrally. In contrast, Yb absorption doped into a YLF crystal host shows pronounced peaks. The peak at about 1020 nm is significant, as it corresponds to large detuning from the mean luminescence wavelength of these materials (~1000 nm). This peak corresponds to an E4-E5 Stark manifold transition in the Yb:YLF material. Referring again to Equation (1), cooling efficiency is enhanced at the E4-E5 peak through increase of absorption efficiency (since background absorption is believed to be constant within the wavelength range of interest for given materials). Because of the temperature dependence of mean luminescence wavelength at the resonant absorption spectrum, a Yb doped crystal host can exhibit cooling efficiency based on both temperature and wavelength. FIG. 6, which is FIG. 2 of Seletskiy, shows a contour plot of cooling efficiency versus wavelength and temperature for known values of background absorption $4.2 \times 10^{-4}$ cm$^{-1}$ and external quantum efficiency of 0.995. The area indicated at E4-E5 corresponds to cooling of the sample. Enhancement of cooling to lower temperatures is demonstrated at about 1020 nm, corresponding to E4-E5 transition. The cooling efficiency is enhanced by exploiting Stark manifold resonance in the cooling tail. However, the cooling crystal 405 is not limited by YLF crystal; rather the described concepts can be applied to any crystal host, exhibiting such levels. The cooling crystal 405 can utilize the excitation of the Stark manifold resonances so cryogenic operation, for even modest purity samples, can be achieved. Currently manageable improvements in material purification can allow nitrogen liquefaction point (i.e., 77K) to be reached with an all-solid-state cryocooler, based on, for example, a Yb:YLF host, pumped in the E4-E5 transition.

The cooling crystal 405 removes heat when pumped with the appropriate laser light. The cooling crystal 405 is connected to the cold load (not shown) while preventing the vast amount of fluorescent emission (which is about 50 times more powerful than the cooling heat lift) from generating unwanted heating. The cooling crystal 405 loses heat by anti-Stokes fluorescence. Heat is conducted from the load (not shown) through the heat spreader 415 and thermal link 410 to the cooling crystal 405. The thermal link 410 is designed to minimize heat from fluorescent radiation reaching the heat spreader 415 and the cold load (not shown). The cold components are housed in a vacuum chamber 420.

Modeling and experiments by the inventors have shown that using a thermal link 410 made of sapphire to connect the cooling crystal 405 to the heat spreader 415 (or cold finger) minimizes the heating by the fluorescence. Because of its kink-shape, the thermal link 410 sheds most of the fluorescence that enters it from the cooling crystal 405. The escaping fluorescent radiation is absorbed by a heat sink 715, which is shown in the exploded view in FIG. 7.

Figure 7:
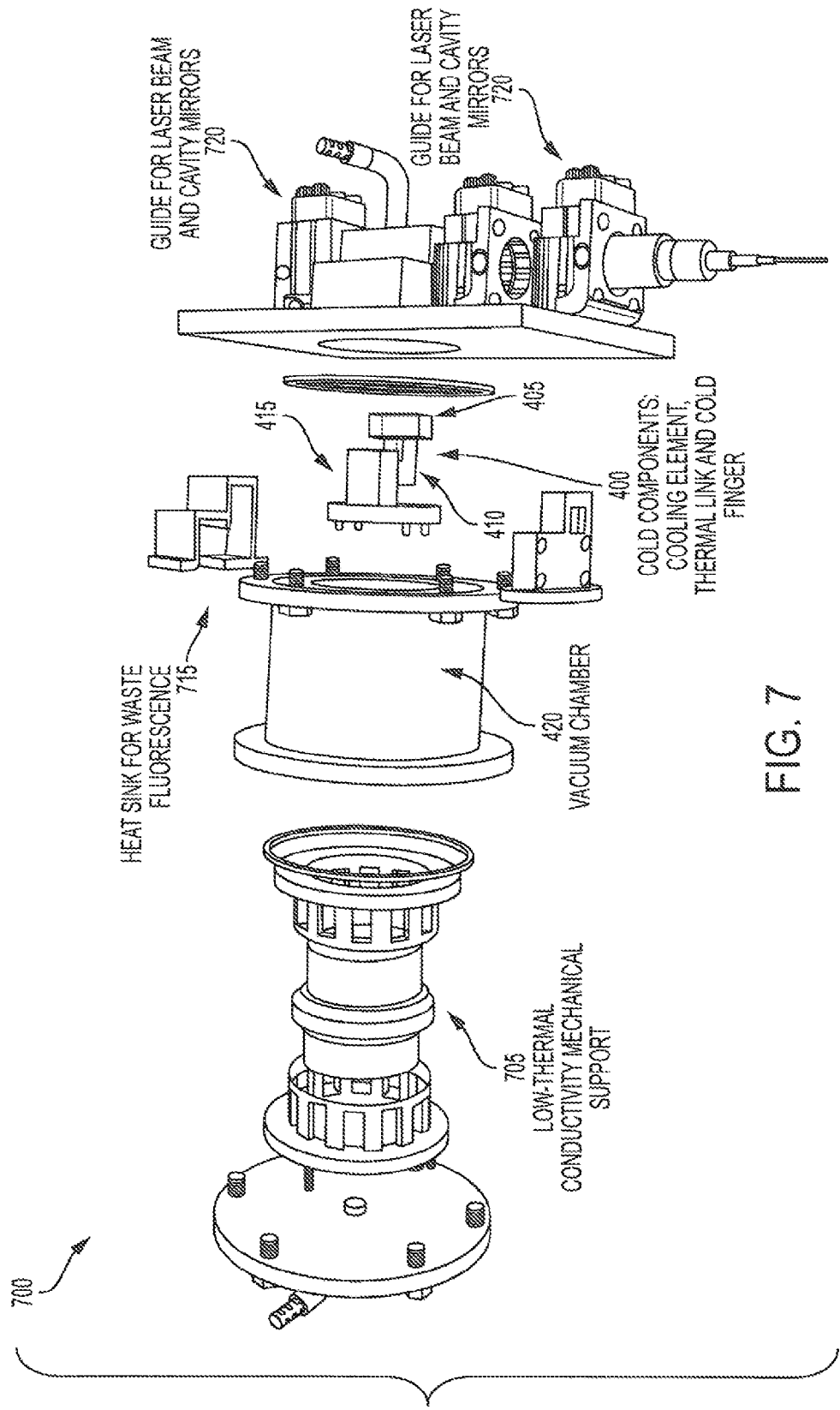
FIG. 7 shows an exploded view of an example optical refrigerator 700, according to embodiments.

FIG. 7 shows an exploded view of an example optical refrigerator 700, according to embodiments. The optical refrigerator 700 comprises components for delivering the laser power to the cooling element, removing the energy of the fluorescence, thermally isolating and mechanically supporting the cold components and maintaining a high vacuum. As shown in FIG. 7, the optical refrigerator 700 comprises low-thermal conductivity mechanical support 705 coupled to the vacuum chamber 420 housing the cold components (cooling crystal 405, thermal link 410, and heat spreader 415) shown in FIGS. 4A and 4B, which is coupled to a guide for laser beam and cavity mirrors 720. The optical refrigerator 700 can comprise optics for delivering the laser beam to the device and a cavity for trapping the light until it is absorbed by the cooling element. For the optical refrigerator 700, the laser focusing optics and the cavity mirrors are mounted outside the vacuum chamber to make adjustments easier. The cold elements 400 of the optical refrigerator 700 are supported by a mechanically stable but low-thermal-conductivity structure. FIG. 7 shows an aerogel support structure. Alternatively, a cage of Kevlar fibers can be used for support. The optical refrigerator 700 can be instrumented with optical fibers to measure the fluorescent spectrum to determine the temperature of the cooling element and with various thermocouples to measure the heat flows through the device.

Figure 8A:
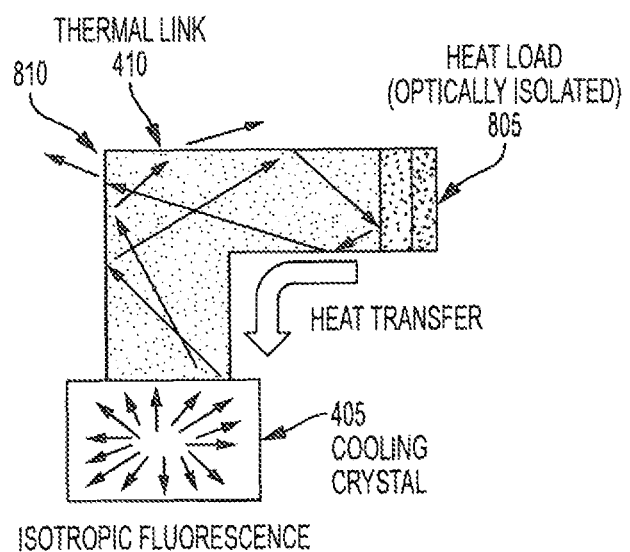
FIG. 8A shows an example kink-style thermal link 410 where heat from the heat load 805 readily diffuses around the kink, according to embodiments.
Figure 8B:
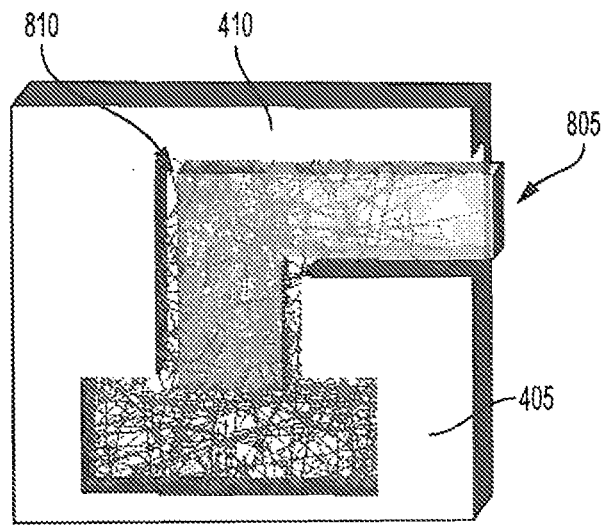
FIG. 8B shows a ZEMAX simulation of the light shedding of the thermal link 410 of FIG. 8A.

In some embodiments, the thermal link 410 can be arranged without using Bragg mirrors. The cooling crystal 405 of the optical refrigerator 700 cools nearly uniformly as heat is removed by the luminescence. To cool a load, such as an infrared detector, the cooling crystal 405 is linked to a heat load 805, so it can draw heat from it. FIG. 8A shows an example kink-style thermal link 410 where heat from the heat load 805 readily diffuses around the kink, according to embodiments. The luminescence largely escapes from the sides of the thermal link 410 when it encounters a sharp angle 810. FIG. 8B shows a ZEMAX simulation of the light shedding of the thermal link 410 of FIG. 8A. The thermal link 410 sets up a temperature gradient between the cooling crystal 405 and the heat load 805. In a good thermal link, this temperature gradient is minimized. At the same time, very little of the fluorescence can be allowed to impinge on any parts of the load; otherwise, radiative heating could easily overwhelm the optical refrigeration effect.

Figure 9:
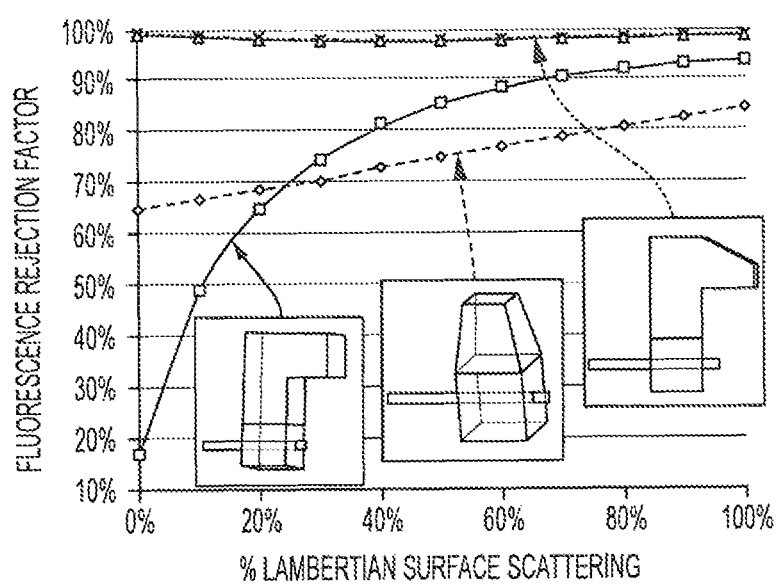
FIG. 9 shows the results of models for three example shapes for the thermal links, according to embodiments.

The thermal link for optical refrigeration applications requires a high thermal conductivity interface while providing shielding of the load on the cold finger from the fluorescence. Different thermal link designs have been studied with modeling and experiments have relied on the use of dielectric Bragg mirrors; however, these types tend to introduce undesired thermal resistance and some degree of heating. The thermal links that met the requirements of the present application do not use any Bragg (dielectric or semiconductor stacks) mirrors. In some embodiments, the thermal link can include tapered-kink thermal link ("TKTL") geometries, which were modeled using ray tracing software ZEMAX, such as the thermal link shown in FIGS. 8A and 8B. The results for three example shapes for the thermal link are shown in FIG. 9. These calculations found that a simple polished TKTL with smooth surfaces (no surface scattering) can provide a fluorescence rejection factor >98%—without any Bragg mirrors, which is a remarkable result. This type of link design not only mitigates the thermal resistance issues associated with Brag mirrors, but also allows direct bonding of the thermal link to the cooling crystal using standard techniques of fusion bonding.

While the disclosure has been illustrated respect to one or more implementations, alterations and/or modifications can be made to the illustrated examples without departing from the spirit and scope of the appended claims. In addition, while a particular feature of the invention may have been disclosed with respect to only one of several implementations, such feature may be combined with one or more other features of the other implementations as may be desired and advantageous for any given or particular function.

Furthermore, to the extent that the terms "including", "includes", "having", "has", "with", or variants thereof are used in either the detailed description and the claims, such terms are intended to be inclusive in a manner similar to the term "comprising." As used herein, the phrase "one or more of", for example, A, B, and C means any of the following: either A, B, or C alone; or combinations of two, such as A and B, B and C, and A and C; or combinations of three A, B and C.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method for stabilizing a property of a first laser beam from a first laser in a vibration-free and cryogen free-manner, the method comprising:
    optically cooling a ytterbium-doped yttrium lithium fluoride (Yb:YLF) crystal using a second laser beam;
    coupling the crystal to a thermal link, wherein the thermal link is further coupled to a reference cavity to maintain a temperate of the reference cavity;
    directing a portion of the first laser beam through the reference cavity onto a photodetector to measure the property of the first laser beam; and
    stabilizing the first laser beam using a feedback control mechanism using the photodetector.

2. The method according to claim 1, wherein the reference cavity comprises a single-crystal silicon Fabry-Perot.

3. The method according to claim 1, wherein the thermal link comprises a sapphire thermal coupling.

4. The method according to claim 1, further comprise maintaining the reference cavity, Yb:YLF crystal, and thermal coupling at or near a vacuum pressure.

5. The method according to claim 1, wherein the temperature is about 124K.

6. The method according to claim 1, wherein the property is a frequency or a wavelength of the first laser.

7. A system for stabilizing a property of a first laser beam of a first laser, laser in a vibration-free and cryogen free-manner, the system comprising:
    a reference cavity comprising an entrance aperture operable to receive the first laser beam and an exit aperture operable to provide the first laser beam to a feedback control system, wherein the reference cavity is optically cooled with a second laser beam characterized with an energy sufficient to maintain a coefficient of thermal expansion of the reference cavity at about zero.

8. The system according to claim 7, wherein the reference cavity comprises a single-crystal silicon Fabry-Perot laser cavity.

9. The system according to claim 7, further comprising:
    a thermally conductive outer member that surround at least a portion of the reference cavity; and
    a thermal coupling comprising a first surface that is coupled to a portion of the thermally conductive outer member and a second surface that is coupled to a ytterbium-doped yttrium lithium fluoride (Yb:YLF) crystal, wherein the Yb:YLF crystal is optically cooled by the second laser beam to produce a thermal gradient in the thermal coupling.

10. The system according to claim 9, wherein the thermal coupling comprises a sapphire thermal coupling.

11. The system according to claim 7, further comprising an enclosure housing the reference cavity, the thermal coupling, Yb:YLF crystal that is maintain at or near a vacuum pressure.

12. The system according claim 7, wherein the property of the first laser beam is a frequency or a wavelength of the first laser beam.

13. The system according to claim 7, further comprising a feedback system operable to receive the first laser beam from a detector that receives the first laser beam from the reference cavity to control the property of the first laser beam.

* * * * *